R. B. Robbins,
Potato Digger.
No. 111,591. Patented Feb. 7, 1871.
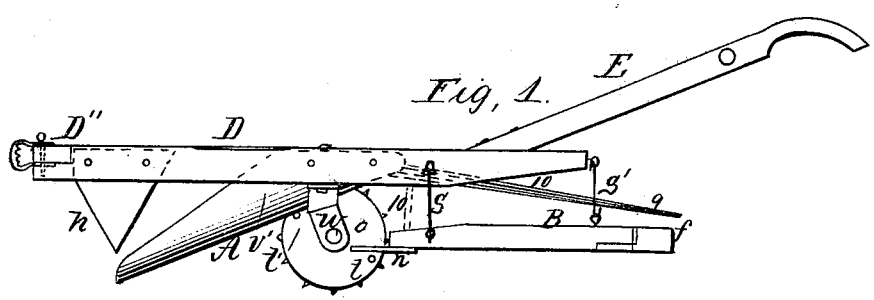
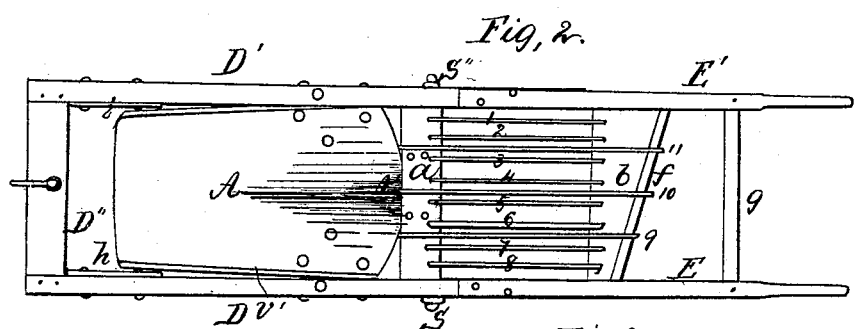
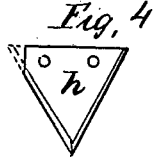
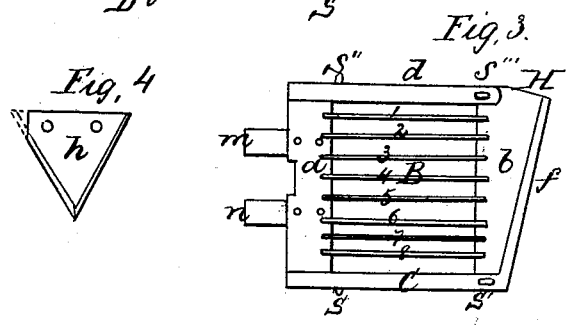
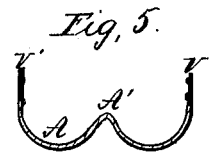
Witnesses,
M. W. Halsey
Henry J. Tripp
Inventor
R. B. Robbins

United States Patent Office.

RICHARD B. ROBBINS, OF ADRIAN, MICHIGAN.

Letters Patent No. 111,571, dated February 7, 1871; antedated January 23, 1871.

IMPROVEMENT IN POTATO-DIGGERS.

The Schedule referred to in these Letters Patent and making part of the same.

I, RICHARD B. ROBBINS, of Adrian, in the county of Lenawee and State of Michigan, have invented certain Improvements in "Potato-Digger," of which the following is a specification.

The nature of my invention relates to the novel and simple construction of a cheap and durable potato-digger, having a shovel-shaped mold-board, by which, as the machine is drawn along by the horses, the hills are elevated above ground and broken and thrown down behind upon a pendent shaking-screen, through which the earth is sifted, and the potatoes separated and laid upon the ground at one side of the machine, in a row, ready to be gathered up.

In the drawing—

Figure 1 is a side elevation of a machine embodying my invention.

Figure 2 is a view from a point above, looking down upon the top of the machine.

Figure 3 is a similar view of the pendent shaker B when detached from the rest of the machine.

Figure 4 is one of the two colters, similarly detached.

Figure 5 is a view of the shape of the rear end of the mold-board.

A is the shovel-shaped mold-board, attached to the railings D and D' of the frame D D' D".

E and E' are the two handles, secured to the railings D D', by which to govern and control the machine.

B is a pendent sieve or shaker, suspended to the frame by the wire pendent rods $s$, $s'$, $s''$, and $s'''$, the two front being hooked to the shaker at the lower ends, and at the upper ends to slide up and down through the loops on the railings of the machine as the forward end of the shaker rises and falls.

This shaker is operated by pins $t\ t'$, &c., on the side of the wheel $o$, striking the cleats $m\ n$.

The mold-board is flange-sided at the rear end, by the elevation of its edges $v\ v'$, fig. 5; also the center is elevated into a ridge, A', the object of the ridge being to break and scatter the hill as far as may be before it is thrown down upon the shaker B.

The forward end of this mold-board is dropped to a level with the bottom of the wheel $o$.

The pendent shaker B consists mainly of the parts $a\ b$, elevated sides $c$ and $d$, and flange $f$, with outlet H and screen-rods 1, 2, 3, &c.

A number of fingers, 9 10 11, projecting rearwardly from the share above the shaker, assist in breaking the clods and support and carry off the vines. One or more of these fingers (10, for instance,) is preferably attached to the shaker, (see fig. 1,) so as to be vibrated with it in order to increase the efficiency of the fender. The remainder may be attached rigidly to the share. The stationary and vibrating fingers are preferably made to alternate as in this arrangement.

$h$ is a triangular colter, sharp on front and rear edges, so as to be reversible, and to cut the soil preparatory to its being elevated by the mold-board.

The wheel $o$ is toothed, to prevent its sliding on the ground.

$w$ is one of two similar ears on opposite sides of the wheel $o$, to support the axle-tree, and is fixed to the mold-board A and frame of the machine.

This machine is designed to be drawn along by two horses hitched to the clevis at the front of the machine, similar to a common plow, the driver steadying the machine by holding onto the handles, the wheel $o$ running in the path made by the mold-board A.

By turning the horses alternately to the right and then to the left at the end of the rows the potatoes from two rows are thrown together, thus making it easier to gather them up.

The colters are made of triangular form, so that the line of draft shall intersect the line of cutting at an acute angle, thus preventing the potato-tops and weeds and other obstructions from sliding up and clogging against the frame and colter, as is often the case with the common plow-colter, having its lower point thrown forward.

I have contemplated using this style of colter on the common plow as well as on this potato-digger.

I claim as my invention—

1. The vibrating screen B, constructed with the lateral outlet H, in combination with the guard-fingers or fenders 9 10 11, arranged and operating as described, as and for the purpose set forth.

2. The combination with the screen B, suspended by links $s\ s^1\ s^2\ s^3$, as described, of the rigid arms or cleats $m\ n$, and central tappet-wheel $o\ t$, as and for the purpose shown.

3. The fender or guard-fingers 9 10 11, attached alternately to the share and vibrating screen, as shown and described, for the purpose shown.

4. The combination and arrangement of the double beam D D' D", share A, constructed as shown and described, and colters $h\ h$, substantially as set forth.

R. B. ROBBINS.

Witnesses:
JULIA M. MULLIKEN,
M. E. STEWART.